United States Patent
Venkatesh

(10) Patent No.: US 10,476,927 B2
(45) Date of Patent: Nov. 12, 2019

(54) SYSTEM AND METHOD FOR DISPLAY STREAM COMPRESSION FOR REMOTE DESKTOP PROTOCOLS

(71) Applicant: Dell Products L.P., Round Rock, TX (US)

(72) Inventor: Ramanujam K. Venkatesh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 557 days.

(21) Appl. No.: 14/954,834

(22) Filed: Nov. 30, 2015

(65) Prior Publication Data
US 2017/0154018 A1    Jun. 1, 2017

(51) Int. Cl.
*G06F 17/00* (2019.01)
*H04L 29/06* (2006.01)

(52) U.S. Cl.
CPC .................. *H04L 65/602* (2013.01)

(58) Field of Classification Search
CPC ....... G06F 17/24; G06F 17/22; G06F 17/2252
USPC ............... 715/201, 203, 734, 740, 744, 761; 348/426.1; 709/203, 226
See application file for complete search history.

(56) References Cited

U.S. PATENT DOCUMENTS

| | | | |
|---|---|---|---|
| 8,769,052 B1* | 7/2014 | Tidd ...................... | G06F 9/5044 345/419 |
| 9,467,458 B2* | 10/2016 | Patesaria ............... | H04L 63/104 |
| 2009/0150909 A1* | 6/2009 | Barreto ................ | G06F 9/4411 719/324 |
| 2010/0254622 A1* | 10/2010 | Kamay ............ | H04N 21/23418 382/239 |
| 2011/0277028 A1* | 11/2011 | Piazza ................. | H04L 63/0209 726/11 |
| 2014/0047143 A1* | 2/2014 | Bateman ................ | H04N 7/181 710/72 |
| 2014/0082235 A1* | 3/2014 | Kaushik ................ | G06F 13/102 710/62 |
| 2015/0054755 A1* | 2/2015 | Kambhatla ............ | G09G 5/006 345/173 |
| 2015/0113157 A1* | 4/2015 | Chan ....................... | H04L 65/60 709/231 |
| 2016/0171925 A1* | 6/2016 | Hussain ............... | G09G 3/2096 710/12 |
| 2016/0219126 A1* | 7/2016 | Oh .......................... | H04L 67/42 |
| 2017/0031852 A1* | 2/2017 | Vajravel .............. | G06F 13/4282 |
| 2017/0070590 A1* | 3/2017 | Balakrishnan ....... | H04L 67/2852 |

(Continued)

OTHER PUBLICATIONS

Frederick Walls and Sandy MacInnis, "VESA Display Stream Compression," Broadcom Corporation, Mar. 3, 2014.

*Primary Examiner* — Stephen S Hong
*Assistant Examiner* — Matthew J Ludwig
(74) *Attorney, Agent, or Firm* — Baker Botts L.L.P.

(57) ABSTRACT

Making a remote desktop protocol (RDP) aware of the availability of display stream compression (DSC) of a DSC device, such as a display-port monitor, at a client conserves system resources. The server may use simple encoding to directly encode any screen content using a DSC format required by the display-port monitor of the client and then send the encoded content to the client. The client need not decode the encoded content, but rather can send the encoded content directly to the appropriate display-port monitor connected or coupled to the client.

17 Claims, 4 Drawing Sheets

(56) References Cited

U.S. PATENT DOCUMENTS

2017/0094074 A1* 3/2017 Yokokawa ............ G06F 3/1423
2017/0270077 A1* 9/2017 Morard ................. G06F 17/211

* cited by examiner

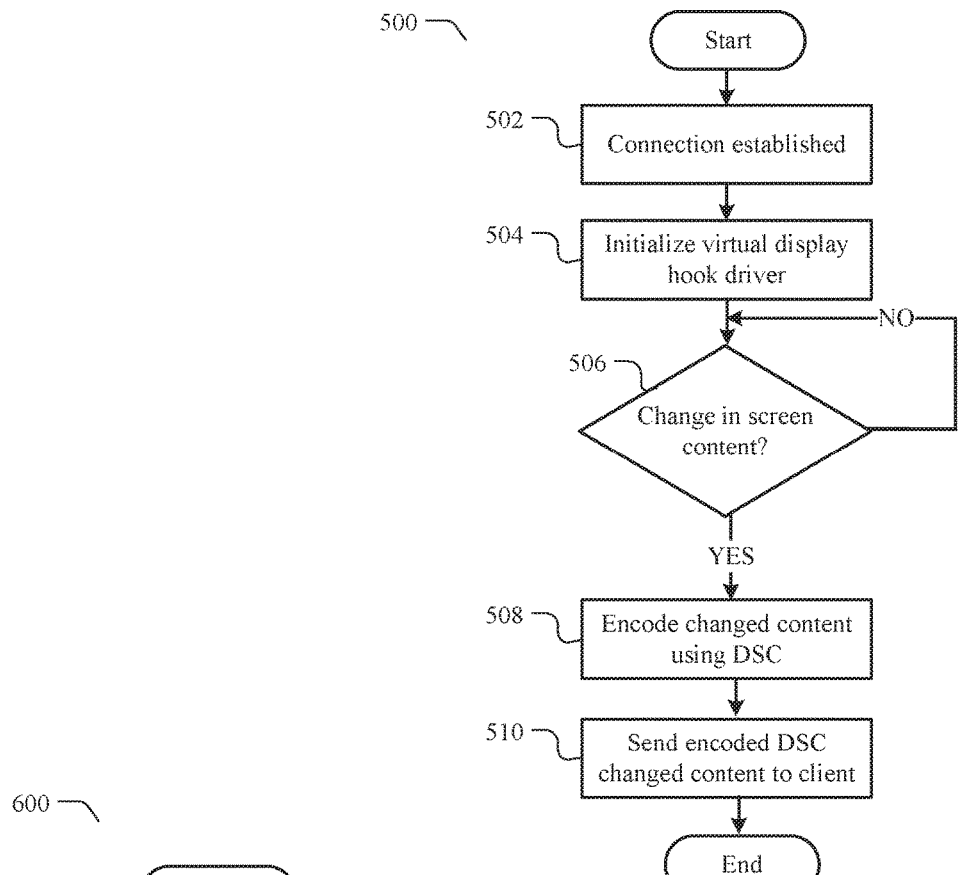
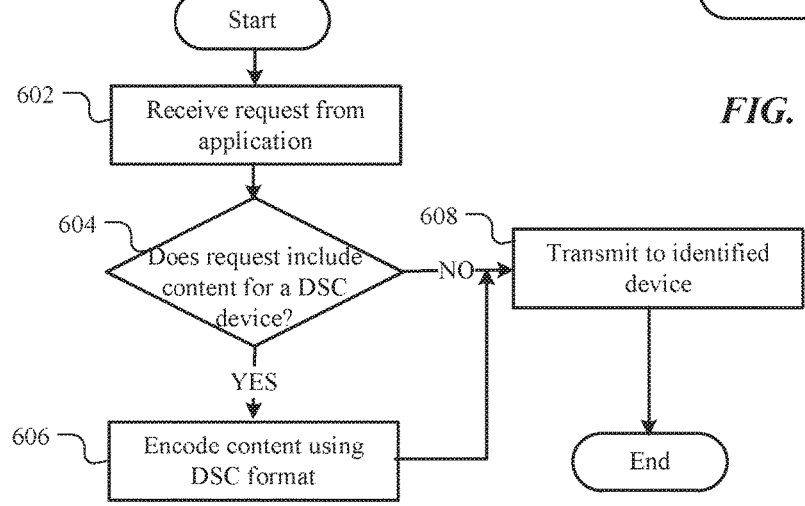
FIG. 5
FIG. 6

SYSTEM AND METHOD FOR DISPLAY STREAM COMPRESSION FOR REMOTE DESKTOP PROTOCOLS

FIELD

The disclosure relates in general to display stream compression for remote desktop protocols and, more particularly, to making remote desktop protocols aware of display-port display stream compression.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One approach to the design and implementation of information handling systems for computer networks, particularly with regard to the development of client/server applications, includes designing client applications and client terminals so that the majority of the heavily used resources are at a remote computing machine, such as a centralized server, connected via a network. The client terminals generally have minimal memory, disk storage, and processor power, but are designed under the premise that most users connected to a powerful server do not need the additional processing power. With these client terminals, the total cost of ownership is minimized, because of the reduced resources and because the clients can be centrally administered and updated from the server. As such, these client terminals are suited for a network that can handle a significant number of terminals. If the client terminals have devices attached to them, then when the client terminals are connected to the server, not only the client terminals but also the client terminals' devices can become available to the server.

Some information handling systems have externally connected devices, such as monitors. One type of monitor is a display-port monitor that supports multi-channel audio playback as well as many advanced audio features. Remote desktop protocols (RDP) such as Microsoft RDP, Citrix independent computing architecture (ICA), and personal computer over internet protocol (PCOIP) use adaptive encoding which involves transform-based algorithms, such as H.264. This enables each type of display content (for example, text, images, video) to be encoded effectively using the best encoder/decoder for the type of content. RDPs use hardware acceleration for encoding at a server and decoding at a client. Hardware acceleration generally uses another hardware component to perform certain functions faster than is possible in software running on a more general-purpose central processing unit (CPU) or GPU. These GPU's are used for hardware acceleration which improves the overall system performance of the information handling system or the computing environment.

More and more display manufacturers are turning to higher-resolution displays to meet customer demand. The increased pixel counts have required increased bandwidth over the links or connections that drive these higher-resolution displays. To support the increase in data on these display links, the video electronic standard association (VESA) has introduced a display stream compression (DSC) standard for the pixel data over the display links of, for example, display-port monitors. These display-port monitors act like a hardware decoder or rather perform hardware acceleration.

However, RDPs may not take advantage of display-port monitors which support DSC over the display links. That is, RDPs may not be taking advantage of the hardware acceleration provided by the display-port monitors. Many RDP clients receive the compressed data from a server and then decode that data using the client GPU. The client again compresses the data to transmit the data over the display links to the associated monitor. This requires several steps including encoding at the server, decoding at the client, and re-encoding at the client resulting in an inefficient use of system resources. Many of the benefits associated with DSC are also not realized as certain encoding for text and images uses wavelet encoding algorithms that are not as robust and efficient as DSC. Further, adaptive encoding is generally used when the network bandwidth is highly available and network latency is low in a private cloud environment which requires more server and client hardware resources than may be required by DSC. The present invention addresses these issues by utilizing DSC for RDPs.

SUMMARY

In one embodiment a method comprises establishing a connection to a client. A total number of display stream compression (DSC) devices coupled to the client is received from the client. Configuration information associated with each of one or more DSC devices coupled to the client is also received. Encoding format and decoding format associated with each of the one or more DSC devices coupled to the client is received. Content is encoded using the encoding format associated with or received for one or more of the one or more DSC devices coupled to the client for which encoding format information was received, wherein the encoding format is a DSC format. The encoded content is sent to one or more identified or selected DSC devices of the one or more DSC devices.

In one embodiment a change in screen content associated with an application is detected for at least one of the one or more DSC devices. The encoding the content comprises encoding the changed screen content. A virtual display hook driver is initialized. A virtual display hook driver may receive from the application the one or more identified DSC devices of the one or more DSC devices. The virtual display hook driver encodes the content, for example, the changed screen content. An adaptive encoder of the virtual display may also be utilized to encode the content. The virtual display hook driver may also detect or intercept the change in display content. An identifier is sent to the client, wherein the identifier specifies the one or more identified DSC devices of the one or more DSC devices.

In one embodiment, one or more computer-readable non-transitory storage media embodying software is operable when executed to perform or implement one or more embodiments. In one embodiment, a system comprises one or more processors and a memory coupled to the processors comprising instructions executable by the processors, the processors being operable when executing the instructions to perform or implement one or more embodiments.

BRIEF DESCRIPTION OF THE DRAWINGS

FIG. 5 is a flowchart illustrating an exemplary method for sending encoded content to a DSC device according to one embodiment of the present disclosure.

FIG. 6 is a flowchart illustrating an exemplary method for handling a request from an application to a specified DSC device at a client according to one embodiment of the present disclosure.

DETAILED DESCRIPTION

Figure 1:
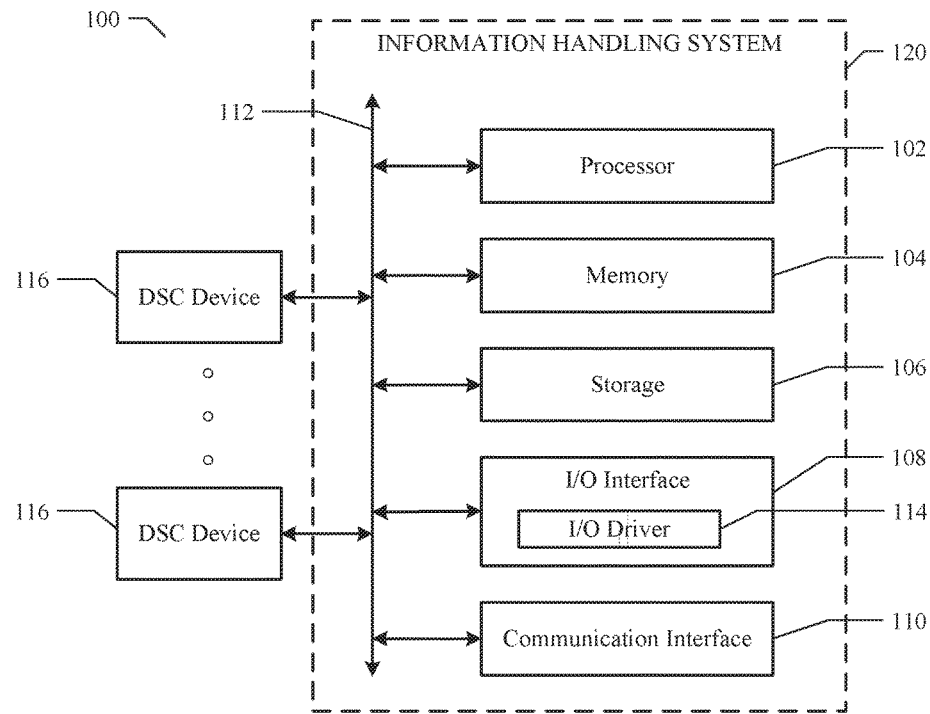
FIG. 1 is a conceptual block diagram of selected elements of an information handling system according to one embodiment of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Frequently, devices connected to client terminals (also referred to as "clients," "thin-clients" or "client-side devices") are virtualized on a server to provide access to the devices from user sessions on the server. The virtualized devices (or redirected devices) are accessible from a large number of user sessions and/or client terminals providing many client terminals the necessary support to fulfill a given computing function. For example, in an office environment, multiple user sessions and/or clients may be connected to a server on which the device is virtualized (or redirected), and all of the multiple user sessions and/or clients connected to the server may have access to the device.

For example, in one computer network environment, multiple display-port monitors may be connected to a single thin-client. Each display-port monitor may be recognized by the operating system (OS), such as Windows, as a separate audio playback device. The display content of an application, including local or virtual applications, may need to be encoded at a server, decoded at a client, and re-encoded at the client before the client can send the display content to a coupled display device.

Video compression standards may not efficiently use all the features and capabilities of certain display devices such as display stream compression (DSC) available for DSC devices such as display-port monitors. Transformation-based algorithms, such as motion picture experts group (MPEG), H.264 and wavelet-based algorithms (such as JPEG 2000 and VC-2) require the storage of many lines of pixel data which may be expensive both in cost and system resources. Also, many algorithms do not produce quality results such that when the display content finally reaches a specified display it suffers from an unacceptable or poor picture quality.

Utilizing DSC of a DSC device, such as a display-port monitor, has several advantages: 1) no extra hardware is required, for example, no extra card or processor is required; 2) performance is optimal as processor(s) of the client are not subsumed with encoding/decoding display content; 3) no need to utilize adaptive encoding as simple encoding is adequate; 4) picture quality is adequate or rather, it is visually loss-less; 5) compressed data rate is constant; 6) supports independently decodable regions of display content; 7) supports multiple video formats (such as RGB, YCbCr4:2:2, 4, 8, 10, or 12 bits/component); 8) inexpensive to implement in real-time using conventional hardware.

A need therefore exists for systems and methods that provide access to the cloud desktop or the remote desktop all the available audio channels of a given client as opposed to only a single audio channel (the redirected default audio channel). The present invention provides redirection of all available audio playback devices connected to a client to a remote server which enables the remote server (or cloud desktop) to take advantage of display-port features making the experience of a user at the local client the same as a user at a remote client.

In the following description, details are set forth by way of example to facilitate discussion of the disclosed subject matter. It should be apparent to a person of ordinary skill in the art, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a personal digital assistant (PDA), a consumer electronic device, a network storage device, or another suitable device and may vary in size, shape, performance, functionality, and price. The information handling system may include memory, one or more processing resources such as a central processing unit (CPU) or hardware or software control logic. Additional components or the information handling system may include one or more storage devices (such as USB mass storage devices), one or more communications ports for communicating with external devices as well as various input and output (I/O) devices, such as a keyboard, a mouse, a wireless device, for example, a Bluetooth device, a video display (such as a display-port monitor), and any other device known to one of ordinary skill in the art. The information handling system may also include one or more buses operable to transmit communication between the various hardware components.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Particular embodiments are best understood by reference to FIGS. 1-6, wherein like numbers are used to indicate like and corresponding parts.

FIG. 1 illustrates a simplified diagram of information handling system configuration 100 in accordance with an aspect of the present disclosure. In particular embodiments, one or more information handling systems 120 perform one or more steps of one or more methods described or illustrated herein. In particular embodiments, one or more information handling systems 120 provide functionality described or illustrated herein. In particular embodiments, software running on one or more information handling systems 120 performs one or more steps of one or more methods described or illustrated herein or provides functionality described or illustrated herein. Particular embodiments include one or more portions of one or more information handling systems 120. Herein, reference to an information handling system may encompass a computing device, and vice versa, where appropriate. Moreover, reference to an information handling system may encompass one or more information handling systems, where appropriate.

This disclosure contemplates any suitable number of information handling systems 120. This disclosure contemplates information handling system 120 taking any suitable physical form. As example and not by way of limitation, information handling system 120 may be an embedded information handling system, a system-on-chip (SOC), a single-board information handling system (SBC) (such as, for example, a computer-on-module (COM) or system-on-module (SOM)), a desktop information handling system, a laptop or notebook information handling system, an interactive kiosk, a mainframe, a mesh of information handling systems, a mobile telephone, a personal digital assistant (PDA), a server, a tablet information handling system, a terminal, a thin client, a slim client, a lean client, or a combination of two or more of these. Where appropriate, information handling system 120 may include one or more information handling systems 120; be unitary or distributed; span multiple locations; span multiple machines; span multiple data centers; or reside in a cloud, which may include one or more cloud components in one or more networks. Where appropriate, one or more information handling systems 120 may perform without substantial spatial or temporal limitation one or more steps of one or more methods described or illustrated herein. As an example and not by way of limitation, one or more information handling systems 120 may perform in real time or in batch mode one or more steps of one or more methods described or illustrated herein. One or more information handling systems 120 may perform at different times or at different locations one or more steps of one or more methods described or illustrated herein, where appropriate.

In particular embodiments, information handling system 120 includes a processor 102, memory 104, storage 106, an I/O interface 108, a communication interface 110, a bus 112, and an I/O driver 114. Although this disclosure describes and illustrates a particular information handling system having a particular number of particular components in a particular arrangement, this disclosure contemplates any suitable information handling system having any suitable number of any suitable components in any suitable arrangement.

In particular embodiments, processor 102 includes hardware for executing instructions, such as those making up one or more modules of a computer program, for example, software. As an example and not by way of limitation, to execute instructions, processor 102 may retrieve (or fetch) the instructions from an internal register, an internal cache, memory 104, or storage 106; decode and execute them; and then write one or more results to an internal register, an internal cache, memory 104, or storage 106. In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 106, and the instruction caches may speed up retrieval of those instructions by processor 102. Data in the data caches may be copies of data in memory 104 or storage 106 for instructions executing at processor 102 to operate on; the results of previous instructions executed at processor 102 for access by subsequent instructions executing at processor 102 or for writing to memory 104 or storage 106; or other suitable data. The data caches may speed up read or write operations by processor 102. The TLBs may speed up virtual-address translation for processor 102. In particular embodiments, processor 102 may include one or more internal registers for data, instructions, or addresses. This disclosure contemplates processor 102 including any suitable number of any suitable internal registers, where appropriate. Where appropriate, processor 102 may include one or more arithmetic logic units (ALUs); be a multi-core processor; or include one or more processors 102. Although this disclosure describes and illustrates a particular processor, this disclosure contemplates any suitable processor.

In particular embodiments, memory 104 includes main memory for storing instructions for processor 102 to execute or data for processor 102 to operate on. As an example and not by way of limitation, information handling system 120 may load instructions from storage 106 or another source (such as, for example, another information handling system 120) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 executes only instructions in one or more internal registers or internal caches or in memory 104 (as opposed to storage 106 or elsewhere) and operates only on data in one or more internal registers or internal caches or in memory 104 (as opposed to storage 106 or elsewhere). One or more memory buses (which may each include an address bus and a data bus) may couple processor 102 to memory 104. Bus 112 may include one or more memory buses, as described below. In particular embodiments, one or more memory management units (MMUs) reside between processor 102 and memory 104 and facilitate accesses to memory 104 requested by processor 102. In particular embodiments, memory 104 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 104 may include one or more memories 104, where appropriate. Although this disclosure describes and illustrates particular memory, this disclosure contemplates any suitable memory.

In particular embodiments, storage 106 includes mass storage for data or instructions. As an example and not by way of limitation, storage 106 may include a hard disk drive (HDD), a floppy disk drive, flash memory, an optical disc, a magneto-optical disc, magnetic tape, or a USB drive or a combination of two or more of these. Storage 106 may include removable or non-removable (or fixed) media, where appropriate. Storage 106 may be internal or external to information handling system 100, where appropriate. In particular embodiments, storage 106 is non-volatile, solid-state memory. In particular embodiments, storage 106 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 106 taking any suitable physical form. Storage 106 may include one or more storage control units facilitating communication between processor 102 and storage 106, where appropriate. Where appropriate, storage 106 may include one or more storages 106. Although this disclosure describes and illustrates particular storage, this disclosure contemplates any suitable storage.

In particular embodiments, I/O interface 108 includes hardware, software, or both, for providing one or more interfaces for communication between information handling system 120 and one or more DSC devices 116. Information handling system configuration 100 may include one or more of these DSC devices 116, where appropriate. In particular embodiments, the DSC device 116 may be an audio playback device, a display-port playback device (such as a display-port monitor) or any other type of DSC device known to one of ordinary skill in the art. One or more of these DSC devices 116 may enable communication between a user (such as a person, administrator, another device or information handling system) and information handling system 120. As an example and not by way of limitation, a DSC device 116 may include a display-port monitor or another suitable DSC device 116 or a combination of two or more of these DSC devices 116. An DSC device 116 may include one or more sensors. This disclosure contemplates any suitable DSC devices 116 and any suitable I/O interfaces 108 for them. Where appropriate, I/O interface 108 may include one or more I/O drivers (such as device or software drivers) 114 enabling processor 102 to drive one or more of these DSC devices 116. I/O interface 108 may include one or more I/O interfaces 108, where appropriate. Although this disclosure describes and illustrates a particular I/O interface, this disclosure contemplates any suitable I/O interface.

In particular embodiments, communication interface 110 includes hardware, software, or both for providing one or more interfaces for communication (such as, for example, packet-based communication) between information handling system 120 and one or more other information handling systems 120 or one or more networks. As an example and not by way of limitation, communication interface 110 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 110 for it. As an example and not by way of limitation, information handling system 120 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, information handling system 120 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Information handling system 120 may include any suitable communication interface 110 for any of these networks, where appropriate. Communication interface 110 may include one or more communication interfaces 110, where appropriate. Although this disclosure describes and illustrates a particular communication interface, this disclosure contemplates any suitable communication interface.

In particular embodiments, bus 112 includes hardware, software, or both coupling components of information handling system 120 to each other. As an example and not by way of limitation, bus 112 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 112 may include one or more buses 112, where appropriate. Although this disclosure describes and illustrates a particular bus, this disclosure contemplates any suitable bus or interconnect.

Figure 2:
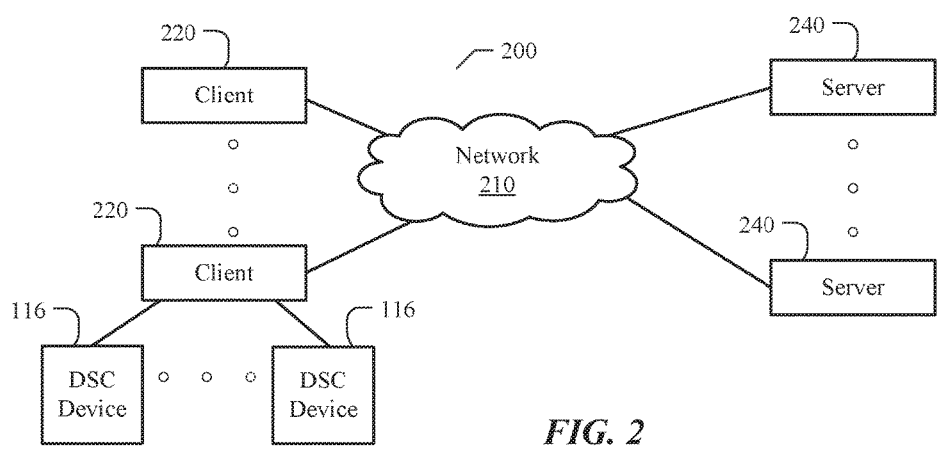
FIG. 2 is a conceptual block diagram of selected elements of a computer network environment according to one embodiment of the present disclosure.

FIG. 2 is a conceptual block diagram of selected elements of a computer network environment 200 according to an aspect of the disclosure. In particular embodiments, one or more clients 220 and one or more servers 240 are connected via network 210. Network 210 may be a public network or a private (for example, corporate) network. Additionally, network 210 may be, for example, a Local Area Network (LAN), a Wide Area Network (WAN), a wireless network, the Internet, an intranet or any other suitable type of network. One or more clients 220 may be connected to the network 210 via a network switch (not shown). In particular embodiments, network 210 may include one or more routers for routing data between clients 220 and/or servers 240. A device (for example, a client 220 or a server 240) on network 210 may be addressed by a corresponding network address including, for example, an Internet protocol (IP) address, an Internet name, a Windows Internet name service (WINS) name, a domain name or other system name. In particular embodiments, network 210 may include one or more logical groupings of network devices such as, for example, one or more sites (for example, customer sites) or subnets. As an example, a corporate network may include potentially thousands of offices or branches, each with its own subnet (or multiple subnets) having many devices. One or more clients 220 may communicate with one or more servers 240 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Client 220 may be a desktop computer, a laptop computer, a tablet computer, a handheld device, a mobile phone, a kiosk, a vending machine, a billboard, or any suitable information handling system 120. In particular embodiments, a client 220 is an embedded computer and may have flash memory (for example, a solid state drive) instead of a hard disk drive. In particular embodiments, a client 220 is a thin client having limited processing capabilities and limited storage, and such a thin client may require minimal management and updates. A client 220 may communicate with a server 240 via one or more protocols such as Hypertext Transfer Protocol (HTTP), Hypertext Transfer Protocol Secure (HTTPS), File Transfer Protocol (FTP), Common Internet File System (CIFS), Independent Computing Architecture (ICA) protocol (developed by Citrix Systems, Inc.), Remote Desktop Protocol (RDP) (developed by Microsoft Corporation), or any suitable protocol or combination of protocols.

In particular embodiments, a client 220 may connect to a DSC device 116. The present invention contemplates client 220 connecting to any number of DSC devices 116. Further, the present invention contemplates any number of clients 220 connecting to one or more DSC devices 116 such that multiple clients 220 may be connected to one or more unique DSC devices 116. In particular embodiments, any number of clients 220 may be connected to the same DSC device(s) 116, one or more DSC device(s) 116, or any combination thereof.

A server 240 may include one or more of: a computing device, a desktop computer, a laptop computer, a database, a corporate server, a repository server, a configuration application server, a domain name system (DNS) server, a dynamic host configuration protocol (DHCP) server, a virtual machine (for example, VMware® Virtual Machine), a desktop session (for example, Microsoft Terminal Server), a published application (for example, Microsoft Terminal Server), or any suitable information handling system 120. As an example, a private (for example, corporate) network may include a device manager server and a repository server each configured to communicate with multiple clients 220 across one or more domains, sites, or subnets of network 210. In particular embodiments, a server 240 may include one or more servers, or functions of one or more servers. A client 220 may access software resources provided by a server 240 such as, for example, operating systems, add-ons, content, or any other suitable data, applications, or images. A server 240 may provide software or other resources automatically to one or more clients 220.

It may be desirable, in the case of a private (for example, corporate) network including multiple sites or subnets to deploy software (including, for example, all or part of one or more operating systems, applications, add-ons, or data) to one or more clients 220 across one or more sites or subnets. The client 220 may, for example, be located remotely from one or more servers 240 (including, for example, device managers or resource repositories).

As used herein, a "local" device of information handling system 120, or a device "locally" connected to information handling system 120, may be a device directly connected to the system using one or more wires or connectors (for example, physically connected to the system), or a device directly connected to the system using a wireless link. For example, DSC device 116 is a local device coupled to information handling system 120 (or client device 220). DSC device 116 may be coupled using a USB connection to client device 220. Furthermore, in one aspect of the disclosure, a local device of an information handling system 120 or a device locally connected to information handling system 120 may include a device within the information handling system 120 (for example, an internal device (not shown) of client 220).

A "remote" device, or a device "remote" to information handling system 120, may be a device that is not directly connected to information handling system 120. For example, server 240 is remote to both client 220 and DSC virtual device 260 because server 240 is not directly connected to client 220 or DSC virtual device 260 but connected indirectly through network 210, which can include, for example, another server 240, or the Internet.

In particular embodiments, client 220 (for example, a thin client, a slim client, or a lean client) or one or more software components associated with client 220 may depend on server 240 to fulfill its computational roles. As an example of a Virtual Desktop Infrastructure (VDI) and not by way of limitation, client 220 may provide one or more terminal services to one or more users of clients 220. As such, the user(s) of client 220 may login to the same server 240 and perform tasks on the same server 240 substantially at the same time. In the VDI, one or more DSC devices 116 may be connected to client device 220. In particular embodiments, for the DSC device 116 to work seamlessly, communications associated with the DSC device 116 may be redirected to a Virtual Desktop (VD) operating system (OS) or a Virtual Machine (VM) OS (for example, WINDOWS SERVER 2003) of the VDI.

Figure 3:
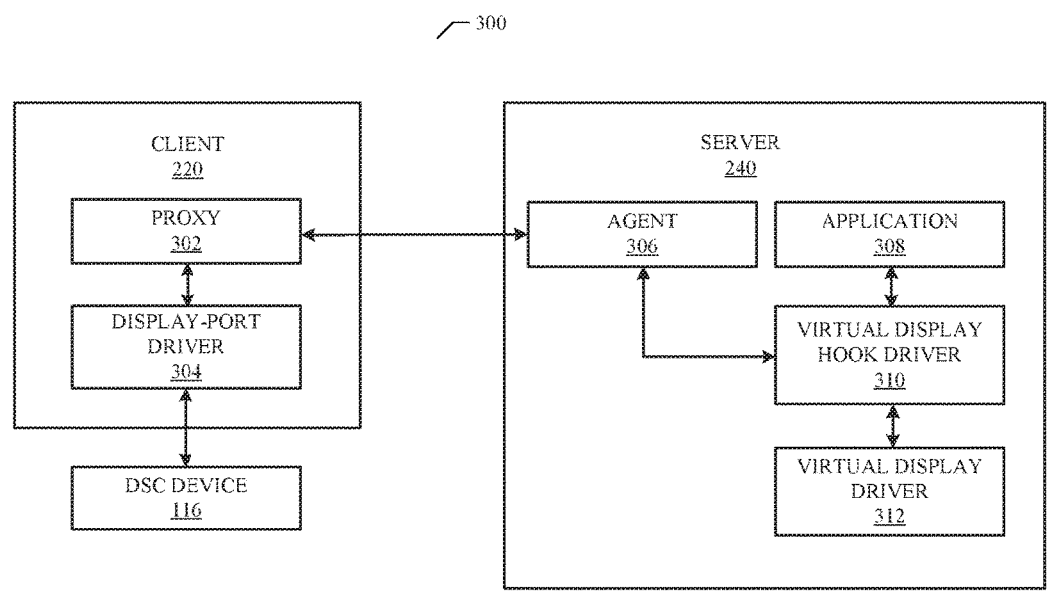
FIG. 3 is a conceptual block diagram of selected elements of a computer network environment according to one embodiment of the present disclosure.

FIG. 3 is a conceptual block diagram of selected elements of a computer network environment 300 according to one embodiment of the present disclosure. Client 220 may include a proxy 302 and a display-port driver 304. A DSC device 116 may be coupled to client 220 and may communicate to proxy 302 via display-port driver 304. Proxy 302 may load one or more display-port drivers 304 when any one or more DSC devices 116 are coupled to the client 220.

Server 240 may include an agent 306, an application 308, a virtual display hook driver 310, and a virtual display driver 312. Virtual display hook driver 310 may be a standard windows driver model (WDM) driver which is configured to load at system boot. During initialization of client 220, the virtual display hook driver 310 hooks the virtual display driver 312, for example by patching the system service descriptor table (SSDT) in a session space. The virtual display hook driver 310, which is visible to the operating system, may also act as an additional virtual monitor on the primary video card. This additional virtual monitor may mirror the main screen or extend the session desktop. The virtual display driver 312 may be used to quickly and efficiently identify any screen changes of the DSC device

116. The virtual display driver 312 is a driver loaded by a standard RDP, such as, Microsoft RDP, Citrix ICA, PCOIP, and any other standard RDP known to one of ordinary skill in the art. The virtual display hook driver 310 sits on top of the virtual display driver 312. The virtual display hook driver 310 intercepts any screen changes or content directed to the virtual display driver 312, analyzes the content, and encodes or compresses the content into a format supported by one or more targeted or selected DSC devices 116. The virtual display hook driver 310 acts as a middleman between the application 308 and the virtual display driver 312. Once the virtual display hook driver 310 encodes the content, the encoded content is sent by the virtual display hook driver 310 via agent 306 to proxy 302 for display by DSC device 116. The adaptive encoder of virtual display hook driver 310 encodes the changed content using DSC and hardware acceleration card (such as a CPU or GPU).

Server 240 may include one or more applications 308. The one or more applications 308 may be applications local to server 240 or virtual applications to server 240. An application 308 may communicate content to DSC device 116 via virtual display hook driver 310.

Figure 4:
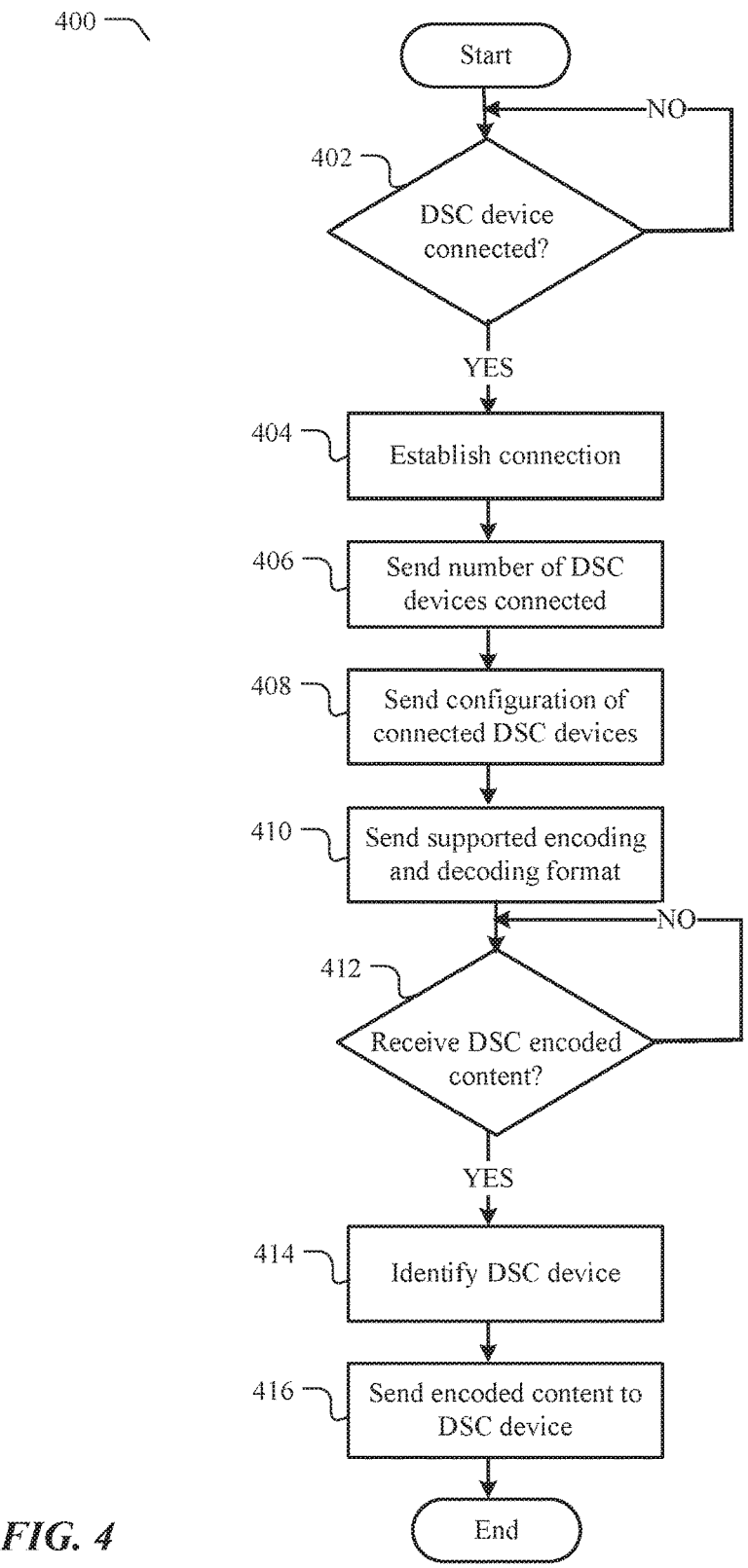
FIG. 4 is a flowchart illustrating an exemplary method for redirecting a DSC device according to one or more embodiments of the present invention.

FIG. 4 is a flowchart in accordance with an embodiment of the present disclosure, shown generally at 400, relating to redirecting one or more DSC devices 116, such as one or more display-port monitors, at client 220 to a server 240.

At step 402, the client 220 polls to determine if a DSC device 116 has been connected to client 220. For example, client 220 may continuously poll to detect whether a newly connected DSC device has been connected to the client 220. That is, client 220 may loop at step 402 continuously, upon a predetermined time interval, or at any other interval or way known to one of ordinary skill in the art until an audio playback device 116 is detected. Client 220 may detect a DSC device 116 connected to the client 220 by any process known to one of ordinary skill in the art. For example, in one embodiment a user may use a graphical user interface (GUI) to inform the client 220 that a DSC device 116 has been connected. In another embodiment, the client 220 may automatically detect without user intervention the connection of a DSC device 116. DSC device 116 may be any known DSC device, for example, a display-port monitor. Client 220 may poll for a connected DSC device 116 in any way known to one of ordinary skill in the art, including, but not limited to, by utilizing an interrupt, timer, semaphore, etc.

If at step 402, a DSC device 116 is detected, then at step 404, one or more display-port drivers 304 associated with the DSC device 116 are loaded and a connection is established with server 240 via proxy 302 and agent 306. The connection may be based, at least in part, on a protocol. In one embodiment, an RDP session according to one or more embodiments of the present disclosure is established. In one embodiment, one or more RDP may be utilized, for example, Microsoft RDP, CITRIX ICA, VMVIEW RDP/personal computer over internet protocol (PCoIP), and Teradici PCoIP. When an RDP session is established, a virtual display hook driver 310 hooks the virtual display driver 312 loaded by any one or more of the RDP.

At step 408, the client 220 sends the number of DSC devices 116 that are coupled to the client 220 to the server 240 via proxy 302 and agent 306. For example, in one embodiment, multiple DSC devices 116 are coupled to the client 220 and any one or more the coupled DSC devices 116 may be display-port monitors. At step 410, the client 220 sends configuration information associated with the DSC devices 116 to the server 240 via proxy 302 and agent 306. The configuration information may include any one or more of vendor identification, manufacturer identification, model, type of device (such as display-port monitor or DSC compatible device), any other type of configuration information known to one of ordinary skill in the art, and any combination thereof.

At step 410, the client 220 sends to the server 240 the supported encoding and decoding format of the DSC devices 116 via proxy 302 and agent 306. The proxy 302 retrieves the supported encoding and decoding format for each coupled DSC device 116 from display-port driver 304.

At step 412, the client 220 polls via proxy 302 to determine if encoded content, such as DSC encoded content, has been received. If encoded content has been received, then at step 414, the DSC device 116 associated with the encoded content is identified. For example, in one embodiment, the server 240 via agent 306 sends the encoded content along with an identifier to the proxy 302 at client 220. The identifier includes location information or specifies the one or more DSC devices 116 that are associated with the encoded content (the DSC devices 116 that are to display the encoded content). At step 416, the client 220 sends the encoded content from server 240 via the display-port driver 304 to the one or more identified DSC devices 116. The one or more DSC devices 116 may then decode the encoded content and render it for display. For example, the client 220 may receive the encoded content over a dedicated socket connection established between an agent 306 and a proxy 302 or through one or more virtual channels supported by RDP, such as, RDP/ICA.

FIG. 5 is a flowchart in accordance with an embodiment of the present disclosure, shown generally at 500, relating to sending encoded data to one or more selected DSC devices 116. At step 502, the server 240 receives a notification (for example, a device plug-in notification) from the client 220 that a DSC device 116 has been coupled to the client 220. For example, the proxy 302 of client 220 initiates communication with agent 306 of server 240 to establish a connection. Once the connection is established between the server 240 and the client 220, at step 504 the virtual display hook driver 310 is initialized. The virtual display hook driver 310 may be configured to load at system boot. During the initialization of the virtual display hook driver 310, the virtual display hook driver 310 hooks the virtual display driver 312.

At step 506, it is determined if a change in screen content associated with an application 308 has occurred. For example, an instructor at a DSC device 116 may have altered content on the screen and may want that content to be displayed on all other DSC devices 116 that are connected to the same session associated with application 308. In one embodiment, the virtual display hook driver 310 detects the change in screen content. At step 508, the changed content received by the application 308 is encoded using DSC by an adaptive encoder of the virtual display hook driver 310. The virtual display hook driver 310 may also utilize hardware acceleration.

At step 510, the virtual display hook driver 310 notifies the agent 306 that encoded content and the identification or location of the one or more DSC devices 116 that the encoded content should be sent to is ready to be communicated to client 220. The agent 306 transmits the encoded content and the identification of the one or more DSC devices 116 associated with the encoded content to the proxy 302.

FIG. 6 is a flowchart in accordance with an embodiment of the present disclosure, shown generally at 600, relating to processing a request from an application to display encoded content at one or more DSC devices 116 at one or more clients 220. At step 602, a request is received by the virtual display hook driver 310 from an application 308 at the server 240. In one embodiment, the application 308 is local to the server. In another embodiment, the application 308 is a virtual application. In one embodiment, the request may be to an application from a first client 220 where at least part of the response to the request will be for certain information (such as graphics) to be displayed at one or more DSC devices 116 of the first client 220. In another embodiment, the request is to an application from a first client 220 where at least part of the response to the request will be for certain information (such as graphics) to be displayed at one or more DSC devices 116 of a second client 220. In another embodiment, the request is to an application from a first client 220 where at least part of the response to the request will be for certain information (such as graphics) to be displayed at one or more DSC devices 116 of the first client and one or more DSC devices 116 of a second client. Any of these embodiments may include any number of DSC devices 116 at any number of clients 220.

At step 604, it is determined if the request includes content directed to one or more DSC devices 116. For example, in one embodiment, the virtual display hook driver 310 may determine that the content is directed to a DSC device 116 based, at least in part, on the configuration information received from the client 220. In another embodiment, the determination is made based, at least in part, on the received encoding formation, decoding format, or any combination thereof. If at step 604, it is determined that the request includes content directed to one or more DSC devices 116, then at step 606 the content is encoded by the virtual display hook driver 310 in a DSC format. At step 608, the encoded content or the data from the application 308 directed to a non-DSC device is transmitted the associated DSC devices 116 or other devices, respectively.

To illustrate the interchangeability of hardware and software, items such as the various illustrative blocks, modules, elements, components, methods, operations, steps, and algorithms have been described generally in terms of their functionality. Whether such functionality is implemented as hardware or software depends upon the particular application and design constraints imposed on the overall system. Skilled artisans may implement the described functionality in varying ways for each particular application.

In one aspect, "means," a block, a module, an element, a component or a processor may be an item (for example, one or more of blocks, modules, elements, components or processors) for performing one or more functions or operations. In one aspect, such an item may be an apparatus, hardware, or a portion thereof. In one example, an item may have a structure in the form of, for example, an instruction(s) encoded or stored on a machine-readable medium, on another device, or on a portion thereof. An instruction(s) may be software, an application(s), a subroutine(s), or a portion thereof. The instructions(s) may be for performing the function(s) or operation(s). The instruction(s) may be executable by one or more processors to perform the function(s) or operation(s). One or more processors may execute the instruction(s) by, for example, transferring or copying and instructions into an executable memory space and executing the instructions. In one example, an item may be implemented as one or more circuits configured to perform the function(s) or operation(s). A circuit may include one or more circuits and/or logic. A circuit may be analog and/or digital. A circuit may be electrical and/or optical. A circuit may include transistors. In an example, one or more items may be implemented as a processing system (for example, a digital signal processor (DSP), an application specific integrated circuit (ASIC), a field programmable gate array (FPGA), etc.), as a portion(s) of any of the foregoing, or as a combination(s) of any of the foregoing. Those skilled in the art will recognize how to implement the instructions, circuits, and processing systems.

In one aspect of the disclosure, when actions or functions (for example, hooking, modifying, intercepting, redirecting, determining, traversing, obtaining, creating, operating, deleting, removing, receiving, providing, generating, converting, displaying, notifying, accepting, selecting, controlling, transmitting, reporting, sending, or any other action or function) are described as being performed by an item (for example, one or more of blocks, modules, elements, components or processors), it is understood that such actions or functions may be performed, for example, by the item directly. In another example, when an item is described as performing an action, the item may be understood to perform the action indirectly, for example, by facilitating such an action (for example, assisting, allowing, enabling, causing, or providing for, such action to occur; or performing a portion of such an action). For example, determining can refer to facilitating determination, attaching can refer to facilitating attaching, and receiving can refer to facilitating receiving. In one aspect, performing an action may refer to performing a portion of the action (for example, performing a beginning part of the action, performing an end part of the action, or performing a middle portion of the action).

A reference to an element in the singular is not intended to mean "one and only one" unless specifically so stated, but rather "one or more." For example, a client may refer to one or more clients, a server may refer to one or more servers, an operation may refer to one or more operations, and a signal, message, or communication may refer to one or more signals, messages, or communications.

Unless specifically stated otherwise, the term "some" refers to one or more. Pronouns in the masculine (for example, his) include the feminine and neuter gender (for example, her and its) and vice versa. Headings and subheadings, if any, are used for convenience only and do not limit the invention.

A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain.

In one aspect, the term "coupled" or the like may refer to being directly coupled. In another aspect, the term "coupled" or the like may refer to being indirectly coupled or communicatively coupled.

Various items may be arranged differently (for example, arranged in a different order, or partitioned in a different way) all without departing from the scope of the subject technology. In one aspect of the disclosure, the elements recited in the accompanying claims may be performed by one or more modules or sub-modules. For example, a local link creation module and a local link deletion module may be combined into one module.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used, such term is intended to be inclusive in a manner similar to the term "comprise" as "comprise" is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirement of 35 U.S.C. § 101, 102, or 103, nor should they be interpreted in such a way. Any unintended embracement of such subject matter is hereby disclaimed.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   establishing, by a server, a connection to a client;
   receiving, by the server, a total number of display stream compression (DSC) devices coupled to the client from the client;
   receiving, by the server, configuration information associated with each of one or more DSC devices coupled to the client from the client;
   receiving, by the server, an encoding format and a decoding format associated with each of the one or more DSC devices from the client;
   initializing, by the server, a virtual display hook driver;
   encoding content, by the virtual display hook driver, using the encoding format received for at least one of the one or more DSC devices, wherein the encoding format is a DSC format; and
   sending, by the server, the encoded content to one or more identified DSC devices of the one or more DSC devices.

2. The method of claim 1, further comprising:
   detecting, by the server, a change in screen content associated with an application; and
   wherein encoding the content comprises encoding the changed screen content.

3. The method of claim 2, further comprising:
   receiving, by the server, from the application the one or more identified DSC devices of the one or more DSC devices.

4. The method of claim 1, wherein the virtual display hook driver detects the change in display content.

5. The method of claim 4, wherein an adaptive encoder of the virtual display hook driver encodes the content.

6. The method of claim 1, further comprising:
   sending, by the server, an identifier to the client, wherein the identifier specifies the one or more identified DSC devices of the one or more DSC devices.

7. One or more computer-readable non-transitory storage media embodying software that is operable when executed to:
- establish, by a server, a connection to a client;
- receive, by the serer, a total number of display stream compression (DSC) devices coupled to the client from the client;
- receive, by the server, configuration information associated with each of one or more DSC devices coupled to the client from the client;
- receive, by the server, an encoding format and a decoding format associated with each of the one or more DSC devices from the client;
- initializing, by the server, a virtual display hook driver;
- encode, by the virtual display hook driver, content using the encoding format received for at least one of the one or more DSC devices, wherein the encoding format is a DSC format; and
- send, by the server, the encoded content to one or more identified DSC devices of the one or more DSC devices.

8. The media of claim 7, wherein the software when executed is further operable to:
- detect, by the server, a change in screen content associated with an application; and
- wherein encoding the content comprises encoding the changed screen content.

9. The media of claim 8, wherein the software when executed is further operable to:
- receive, by the server, from the application the one or more identified DSC devices of the one or more DSC devices.

10. The media of claim 7, wherein the virtual display hook driver detects the change in display content.

11. The media of claim 10, wherein an adaptive encoder of the virtual display hook driver encodes the content.

12. A system comprising:
- one or more processors; and
- a memory coupled to the processors comprising instructions executable by the processors, the processors being operable when executing the instructions to:
  - establish, by a server, a connection to a client;
  - receive, by the server, a total number of display stream compression (DSC) devices coupled to the client from the client;
  - receive, by the server, configuration information associated with each of one or more DSC devices coupled to the client from the client;
  - receive, by the server, an encoding format and a decoding format associated with each of the one or more DSC devices from the client;
  - initializing, by the server, a virtual display hook driver;
  - encode content, by the virtual display hook driver, using the encoding format received for at least one of the one or more DSC devices, wherein the encoding format is a DSC format; and
  - send, by the server, the encoded content to one or more identified DSC devices of the one or more DSC devices.

13. The system of claim 12, wherein the processors are further operable when executing instructions to:
- detect, by the server, a change in screen content associated with an application; and
- wherein encoding the content comprises encoding the changed screen content.

14. The system of claim 13, wherein the processors are further operable when executing instructions to:
- receive, by the server, from the application the one or more identified DSC devices of the one or more DSC devices.

15. The system of claim 12, wherein the virtual display hook driver detects the change in display content.

16. The system of claim 15, wherein an adaptive encoder of the virtual display hook driver encodes the content.

17. The system of claim 12, wherein the processors are further operable when executing instructions to:
- send, by the server, an identifier to the client, wherein the identifier specifies the one or more identified DSC devices of the one or more DSC devices.

* * * * *